Sept. 29, 1970 S. F. BROWN ET AL 3,531,788

APPARATUS FOR LOADING AND UNLOADING A SLIDER ASSEMBLY

Filed Sept. 30, 1968

INVENTORS
STANLEY F. BROWN
STEVEN J. MACARTHUR

BY Robert B Crouch

United States Patent Office 3,531,788
Patented Sept. 29, 1970

3,531,788

APPARATUS FOR LOADING AND UNLOADING A SLIDER ASSEMBLY

Stanley F. Brown and Steven J. MacArthur, San Jose, Calif., assignors to Information Storage Systems, Inc., San Jose, Calif., a corporation of California Filed Sept. 30, 1968, Ser. No. 763,595
Int. Cl. G11b 5/54, 5/60
U.S. Cl. 340—174.1 5 Claims

ABSTRACT OF THE DISCLOSURE

Loading and unloading apparatus for an array of slider assemblies including permanently-torqued rods for loading the assemblies in pairs and an inclined plane associated with each slider assembly for unloading the assembly against the force exerted by the rod.

Background

In the magnetic recording of data on a moving medium it is necessary to position the read-write head as close as possible to the recording surface of the medium without actual contact therebetween, and then to maintain the head-to-surface spacing constant as the medium moves past the head or vice versa. In current direct access data storage devices this requirement becomes severe as a result of the high recording densities and high data rates inherent in such devices. The usual approach to supporting a read-write head in close proximity to a recording surface is, by means of a slider bearing, i.e., to mount the head in a slider and then float the slider on a thin layer of air carried by the moving surface. In order to obtain the required spacing and to achieve the necessary stability with a slider-mounted head, or slider assembly, it is necessary to apply a preload to the slider to insure that it will follow the surface without deviation. This preload is commonly applied to the slider by pneumatic or mechanical means, such as by a piston, flexure spring, etc. In this regard it is well known to support the slider assembly on the distal end of a cantilever leaf spring access arm which is provided with a permanent set toward the recording surface. This arrangement is difficult and complicated to assemble in the usual situation where a number of slider assemblies are provided to cooperate with several closely-spaced recording surfaces, since each arm must be assembled in its loaded condition. In addition it is very difficult, if not impossible, to obtain a uniform loading force on every slider assembly with this arrangement.

The invention

The present invention avoids the shortcomings of the prior art devices by provision of an improved apparatus for loading and unloading a slider assembly into and out of recording relationship with a recording surface. This apparatus allows the access arm to be assembled in an unloaded condition and permits close control of the loading forces. This is accomplished by means of an external loading device positioned adjacent each pair of slider assemblies, means for permanently loading all the devices simultaneously after the entire array of head-arm assemblies is mounted in a movable support mechanism and inclined plane means for unloading each slider individually against the force from the loading device whenever the head-arm assembly is withdrawn from the recording surfaces.

The foregoing and other objects, features and advantages of the invention will be apparent from the following more particular description of the preferred embodiment of the invention as illustrated in the accompanying drawings, wherein.

Figures 1, 2, 3:
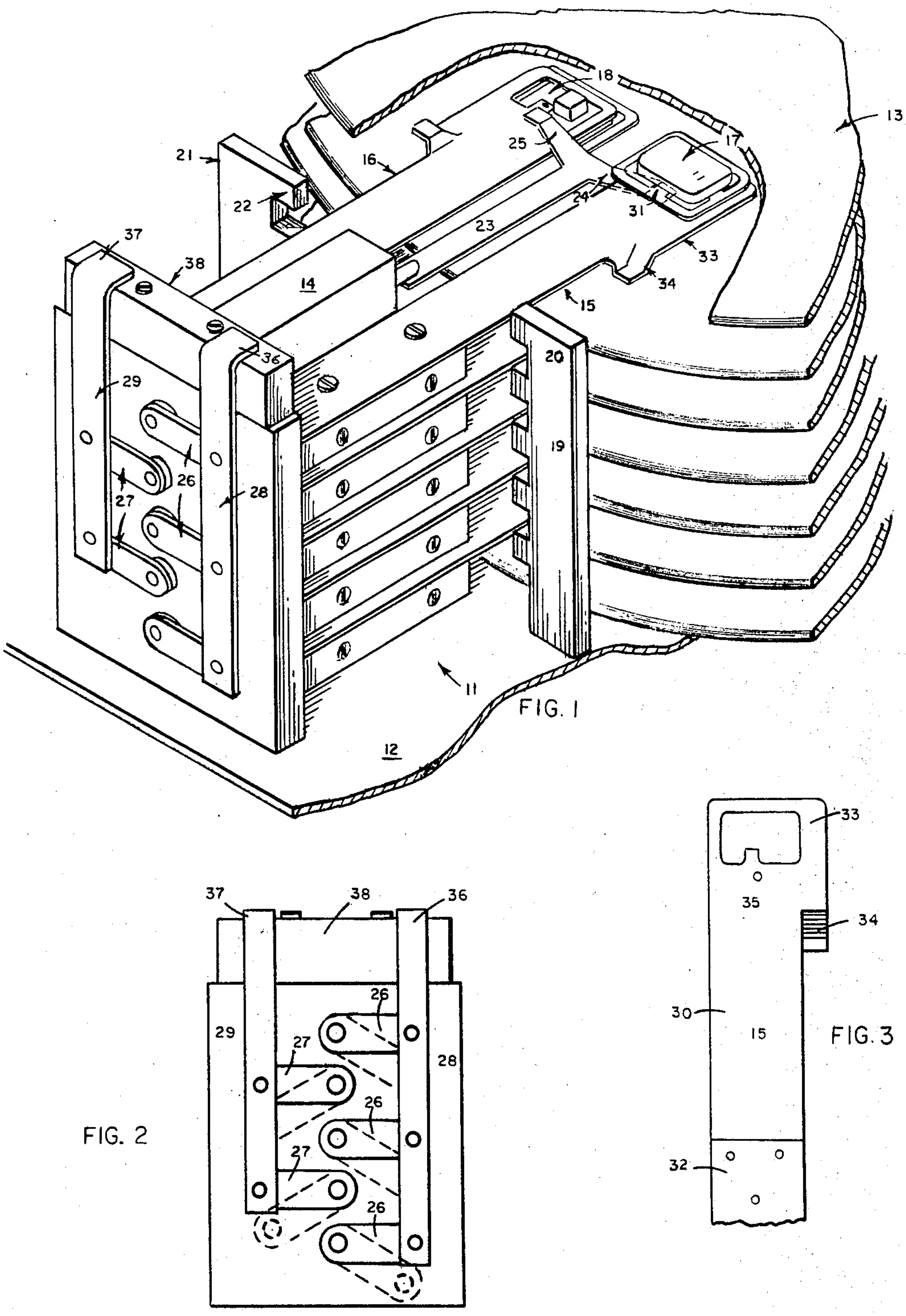
FIG. 1 is a perspective view of a portion of an access mechanism embodying the loading and unloading apparatus of the present invention.
FIG. 2 is a rear elevation view of the mechanism of FIG. 1 illustrating the manner in which the loading devices of FIG. 1 are locked in position.
FIG. 3 is a plan view of one of the access arms of FIG. 1.

Referring to FIG. 1 of the drawing a receiver assembly 11 is supported above a base plate 12 for movement radially of a stack of recording disks 13. The receiver assembly includes a T-block 14 which is adapted to be connected to a linear drive motor (not shown). A series of protruding access arms 15, 16 are arranged in pairs and mounted on the T-block in cantilever fashion to extend toward the disk stack 13. Read-write heads are positioned in sliders 17, 18 which are mounted on the distal ends of the access arms to form head-arm assemblies. The head-arm assemblies are arranged in pairs with the sliders thereof facing oppositely, i.e., slider 17 is positioned above arm 15 and faces upwardly, while slider 18 is positioned below arm 16 and faces downwardly. This arrangement is reversed in vertically adjacent pairs of head-arm assemblies, so that every other pair of head-arm assemblies is as shown, while the alternate pairs of head-arm assemblies have the sliders on the left positioned above the arms and facing up and the sliders on the right positioned below the arms and facing down. A vertically extending post 19 having a series of spaced projections 20 is mounted on the base plate near the disk stack and immediately adjacent the path of travel of the arms 15. A similar post 21, including projections 22, is mounted on the opposite side of the receiver assembly immediately adjacent the path of travel of the arms 16. An elongated torque rod 23 is associated with each pair of head-arm assemblies. Each torque rod is supported in the T-block to protrude between the arms of its associated pair and in approximately the plane thereof. Each torque rod is provided with a pair of oppositely-directed fingers 24 and 25 at its distal end. The opposite end of each rod extends through a bore in the T-block and is pinned, or otherwise secured, to a crank 26, 27. Cranks 26 are pivotally secured to a common, vertically extending link 28, while cranks 27 are likewise secured to a common link 29.

Referring to FIG. 3, each of the access arms includes an elongated, rigid, sheet-metal section 30 provided with a slider-supporting gimbal 31 (FIG. 1) adjacent one end. A flexible leaf spring section 32 is fixed to the end of section 30 removed from the gimbal 31. A laterally extending platform section 33 is formed along an edge of section 30 adjacent the gimbal and includes an inclined plane section 34 at the extremity of the platform remote from the gimbal. A contact surface 35 is provided adjacent the distal end of the arm on the surface opposite from the gimbal 31.

In assembling the apparatus of FIG. 1 the torque rods are mounted in the T-block. A series of vertically aligned bores are provided in the T-block from front to back. The end of each torque rod remote from the fingers is inserted in a bore from front to back until the extremity protrudes from the back of the T-block. A crank is then secured to the end of the torque rod in any suitable manner to prevent relative motion therebetween. Alternate cranks are then pivotally connected to links 28 and 29. The T-block is then connected to a linear drive motor (not shown) and aligned with the disk pack. Each head-arm assembly is positioned adjacent a torque rod with its platform 33 bearing against an edge of one of the projections on the adjacent post and with the contact surface 35 in vertical alignment with one of the fingers of the torque rod. The individual head-arm assemblies are then clamped to the T-block such that each arm extends in a generally horizontal plane. A portion of the leaf spring section 32 of each arm is unsupported to allow the rigid section 30 to pivot in a vertical plane above the unsupported leaf spring as an axis. The head-arm assemblies are arranged in pairs and mounted in a common plane with one arm on either side of the torque rod. The slider-mounting gimbal arrangements on the arms of each pair are reversed, with the slider on one arm facing downward while that of the remaining arm faces upward.

Operation

When the apparatus of FIG. 1 is assembled the slider assemblies are loaded by means of the links 28, 29. Each link is raised vertically and the upper extremities 36, 37 of the links are secured to a bracket 38 which is mounted on the upper surface of the T-block. Raising the links moves the cranks 26, 27 from the dotted-line position of FIG. 2 to the full line position, thus rotating each of the torque rods a uniformly determined amount. Rotation of the torque rods moves the laterally extending fingers 24, 25 of each rod against the contact surfaces 35 of the associated arms. Continued rotation of the torque rods causes the fingers to flex and transmits a uniform loading force through the fingers to the contact surfaces of the arms. This force is applied to each of the arms 16 to load the attached slider assembly into close proximity with the associated disk surface.

The platform 33 on each of the arms 15 bears against an edge of a projection 20 on the post 19 to prevent vertical movement of the arm under application of the loading force. Similarly platforms 33 on arms 16 bear against an edge of a corresponding projection 22 on post 21, preventing vertical movement of the arms 16. At this point the slider assemblies are clear of the disk stack and are out of recording relationship with the disk surfaces. To initiate read-write operation when the disk stack is in position on the base plate, the receiver assembly, as shown in FIG. 1, is moved toward the disk stack by means of a drive motor (not shown). Platforms 33 on the arms ride along the edges of the projections 20 and 22 on the posts 19 and 21, respectively, until the slider assemblies are received within the spaces between adjacent disk surfaces. As the slider assemblies are extended into the spaces between the disks, the platform 33 of each arm moves past the posts 19, 21 until the inclined plane section 34 of each arm bears against the respective edge of the projection on the post. As the inclined plane sections traverse the projections the loading force applied through the fingers on the torque rod causes the arms of each pair to move vertically in opposite directions. The loading force causes the arms to flex about the unsupported segments of the leaf springs and brings the slider assemblies into recording relationship with the surfaces. Continued movement of the receiver assembly causes the inclined plane sections to move free of the projections as the sliders float about the disk surfaces. During the read-write operations there is no further contact between the arms and the projections on the posts 19 and 21 as the transducers are positioned at various locations on the disks.

When the transducers are withdrawn from proximity with the recording surfaces the receiver assembly is moved away from the disk stack. Before the slider assemblies clear the edges of the disks, the inclined plane sections contact the edges of the projections on the posts. Continued movement of the receiver assembly causes the inclined plane sections to ride up on the edges of the projections, lifting the slider assemblies out of recording relationship with the disk surfaces. Platforms 33 then bear against the projections as the slider assemblies are withdrawn from the disks.

As can be seen from the above description, the head-arm assemblies are assembled on the T-block in their unloaded condition due to the planar construction of the arms. This is a relatively simple operation, since each arm can be put in place without interference with, or from, any of the adjacent arms. When the arms are clamped in place they are loaded by means of the links 28 and 29. Loading is intended to be permanent, in that as long as the receiver assembly functions properly, the load is never removed. When the receiver assembly is withdrawn from the disk stack to permit removal of the disks, the slider assemblies are moved out of recording relationship with the disk surface by means of the inclined plane sections operating against the edges of the projections. However this movement is against the loading force applied through the torque rods and fingers. The individual torque rods can be calibrated so that a uniform force is applied to each of the arms.

While the present invention has been particularly shown and described with reference to a preferred embodiment thereof, it will be understood by those skilled in the art that various changes in the form and details may be made therein without departing from the spirit and scope of the invention.

We claim:

1. In a direct access data storage device which includes a stack of rotatable magnetic recording disks and an array of slider assemblies for read-write operations, apparatus for loading and unloading the slider assemblies into and out of recording relationship with the disks, including:

a movable support member carrying a series of generally planar, cantilevered access arms arranged in pairs, each arm having a slider assembly mounted at its distal end;

loading means mounted in the support member and bearing against the access arms;

means connected to the support member for permanently setting the loading means to apply a continuous loading force to the arms for loading the slider assemblies into recording relationship with the disks; and means carried by each arm for lifting the distal ends of the arms away from the disks against the force exerted by the loading means whenever the slider assemblies are withdrawn from the disk stack, said last named means including a laterally extending surface on each arm and a pair of posts having a series of projections mounted adjacent the disc stack, the surfaces being adapted to bear against the projections when the slider assemblies are withdrawn.

2. Apparatus as defined in claim 1 wherein:

each access arm includes a planar leaf spring section clamped to the support member and a rigid section secured to the leaf spring section.

3. Apparatus as defined in claim 2 wherein:

the means for permanently setting the loading means includes a series of cranks connected to the loading means and means for rotating the cranks and locking them to the support member to maintain them in the rotated position.

4. Apparatus as defined in claim 3 wherein:

each laterally extending surface includes an inclined plane section for guiding the surfaces onto the projections as the slider assemblies are withdrawn.

5. Apparatus as defined in claim 3 wherein:

at least one link is connected to the cranks and is secured to the support member to hold the cranks in position.

References Cited

UNITED STATES PATENTS

| | | | |
|---|---|---|---|
| 3,051,954 | 8/1962 | Osterlund | 179—100.2 |
| 3,057,970 | 10/1962 | Brunner | 179—100.2 |
| 3,311,902 | 3/1967 | Appleton | 340—174.1 |

STANLEY M. URYNOWICZ, Jr., Primary Examiner

V. P. CANNEY, Assistant Examiner